US007631070B2

(12) United States Patent
Lewis

(10) Patent No.: US 7,631,070 B2
(45) Date of Patent: Dec. 8, 2009

(54) SIGNAL ASSESSMENT

(75) Inventor: Michael Lewis, Märsta (SE)

(73) Assignee: Infineon Technologies AG, Neubiberg (DE)

( * ) Notice: Subject to any disclaimer, the term of this patent is extended or adjusted under 35 U.S.C. 154(b) by 826 days.

(21) Appl. No.: 10/742,427

(22) Filed: Dec. 19, 2003

(65) Prior Publication Data

US 2005/0138155 A1 Jun. 23, 2005

(51) Int. Cl.
*G06F 15/16* (2006.01)

(52) U.S. Cl. ........................ 709/224; 709/223; 709/225; 709/238

(58) Field of Classification Search ................. 709/223, 709/238, 224, 225; 370/401; 455/432
See application file for complete search history.

(56) References Cited

U.S. PATENT DOCUMENTS 6,580,700 B1 * 6/2003 Pinard et al. ................ 370/332
2003/0120801 A1 * 6/2003 Keever et al. ............... 709/237
2003/0142629 A1 * 7/2003 Krishnamurthi et al. .... 370/249
2003/0206532 A1 * 11/2003 Shpak ........................ 370/322
2005/0003827 A1 * 1/2005 Whelan ....................... 455/454
2005/0064870 A1 * 3/2005 Gabara et al. ............... 455/438
2005/0100029 A1 * 5/2005 Das ............................ 370/401

FOREIGN PATENT DOCUMENTS

WO 02058248 7/2002

OTHER PUBLICATIONS

EP Office Action for European Application No. 03 445 147.6-1249 mailed Jun. 8, 2007 (5 pages).

* cited by examiner

*Primary Examiner*—William C Vaughn, Jr.
*Assistant Examiner*—Djenane M Bayard
(74) *Attorney, Agent, or Firm*—Dicke, Billig & Czaja, PLLC

(57) ABSTRACT

A communication system comprises at least a first and a second access point and a network arrangement device to receive radio signaling from at least a first station and to relay messages received through the radio signaling from the at least first station to the network management device. Each of the access points extracts performance data, for each message received from the at least first station, from the radio signaling. Each of the access points generates a message identity for each message received from the station. The message identity uniquely identifies a transmitted message, each of the at least first and second access point is provided to send radio performance messages to the network management device comprising at least the message identity and the performance data, and the network management device is provided to receive the radio performance messages from the at least first and second access point.

15 Claims, 3 Drawing Sheets

Receive transmission from Station — 201
Calculate radio performance data — 202
Determine Reception Time — 203
Is station Associated? — 204
No
Generate Performance message including performance data and reception time — 205
Yes
Include performance data and Reception time in relay message — 207
Send message to Access router — 206

SIGNAL ASSESSMENT

TECHNICAL FIELD OF THE INVENTION

The present invention relates to a communication system, an access point and an access router for communication in a network and a method therefore. More specifically the present invention relates to a communication system, an access point and an access router for increasing performance in a network comprising radio links and a method therefore.

BACKGROUND OF THE INVENTION

There is growing interest in the idea of light-weight access points, where a wireless LAN (Local Area Network) consists of a number of cheap and simple base station devices, also known as access points or APs connected to a central access router or AR. The AR is responsible for forwarding of data received by the APs to the wider network, and can also perform network management functions. Evidence of the level of interest is the formation of an IETF (Internet Engineering Task Force) study group who are producing a draft for LWAPP (light-weight access point protocol).

One of the cited advantages of the light-weight access point configuration is that, other than allowing the individual access points to be less complex, MAC-layer information such as RSSI (received signal strength indications) for received packets or messages can be passed to the central AR and used for decisions on network management, e.g. load balancing and handover decisions. It is clear that these types of decision. can only be made if knowledge of the entire network status including signal quality, e.g. RSSI is available.

One of the issues in using RSSI information as a basis for network management is to be able to link the RSSI information with a particular station. However, this in itself is not enough since a station may send different frames at different power levels depending on the situation, and movement of a station may also cause different frames to be received with different power levels. Also, transmission errors such as collisions may mean that one AP may successfully receive a transmission while another AP does not. All of the above indicate that one must only compare RSSI indications for the same frame transmission in order to be able to make meaningful assessments.

It has been proposed that an AP could send RSSI measurements along with data frames received from a station. If more than one AP receives a transmission, the RSSI can in principle be compared.

A primary drawback with the proposed solution is that, in itself, the received data frame does not necessarily contain sufficient information to uniquely identify the transmission. In the case of an IEEE 802.11 WLAN (wireless Local Area Network), the address of the transmitter is encoded in the transmitted frame, along with a packet sequence number and a flag to indicate a retransmission. However, if more than a single retransmission of the frame is performed it is no longer possible to distinguish between subsequent transmitted frames.

A secondary drawback with the proposed solution is that the amount of data transmitted over the network between the access points and the access router is multiplied by the number of access points, receiving the transmitted frame or message, which generates a substantial network load.

SUMMARY OF THE INVENTION

It is a main object of the present invention to provide such apparatus and method that at least alleviate the above problems.

It is in this respect a particular object of the invention to provide such apparatus and method that facilitate performance in a radio network.

It is in this respect a particular object of the invention to provide such apparatus and method that can measure and compare signaling characteristics for individual messages from a station in a radio network.

It is in this respect a particular object of the invention to provide such apparatus and method that can determine which access point is preferable to use from a radio performance point of view in communication between a station and an access point.

It is in this respect another particular object of the invention to provide such apparatus and method that reduce network load when performing performance measurement.

It is still a further object of the invention to provide such apparatus and method that provide possibility for load balancing and hand-over in a radio data network.

These objects among others are, according to a first aspect of the present invention, attained by a communication system comprising at least a first and a second access point and a network management device, the at least first and second access point is provided to receive radio signaling from at least a first station and one of the at least first and second access point is provided to relay messages received through the radio signaling from the at least first station to the network management device. Each of the at least first and second access point comprises radio communication performance means provided to extract performance data, for each message received from the at least first station, from the radio signaling.

The invention is characterized in that each of the at least first and second access point comprises a message identification means provided to generate a message identity for each message received from the station and where the message identity uniquely identifies a transmitted message, each of the at least first and second access point is provided to send radio performance messages to the network management device comprising at least the message identity and the performance data, and the network management device is provided to receive the radio performance messages from the at least first and second access point.

The above objects among others are, according to a second aspect of the present invention, attained by a method for communication in a network comprising at least a first and a second access point, at least a first station and a network management device. The method is characterized in the steps of: receiving radio signaling, at the at least first and second access points, from the at least first station, relaying messages received from the at least first station by one of the at least first and second access point, extracting performance data from the radio signaling for receiving messages from the at least first station by each of the at least first and second access point, generating, in each of the at least first and second access point, a message identity for each message received from the station and where the message identity uniquely identifies a transmitted message, sending, from each of the at least first and second access point, device radio performance messages to the network management comprising at least the message identity and the performance data, and receiving the radio performance messages from the at least first and second access point at the access router.

The above objects among others are, according to a third aspect of the present invention, attained by an access point in a network, wherein the network comprises at least a first station and a network management device, the access point is provided to receive messages from the station and, if associated with the station, relay the messages, and the access point comprises radio communication performance means provided to extract performance data from the radio messages received from the at least first station. The invention is characterized, according to the third aspect, in that the access point comprises a message identification means provided to generate a message identity for each message received from the station and where the message identity uniquely identifies a transmitted message, and that the access point is provided to send radio performance messages to the network management device comprising at least the message identity and the performance data.

The above objects among others are, according to a fourth aspect of the present invention, attained by a network management device in a network, wherein the network comprises at least a first and a second access point and a station. The invention is characterized, according to the fourth aspect, in that the network management device is provided to receive performance messages from each of the at least first and second access point wherein each message comprises at least radio performance data and a message identity uniquely identifying the message, and wherein the network management device is provided to compare radio performance data from each access point having same message identity to identify the access point having the most favorable radio characteristics. According to another aspect device of the present invention the network management device is an access router, and is provided to further relay messages, received from an station and relayed through an access point, to another network.

By providing each message, or frame transmission, with a unique identity and determining radio signaling performance in each access point receiving the message and then sending the performance data together with message identity information to an access router, conclusions can be made regarding the particular radio environment for communication between each access point and the specific station sending the transmission. These conclusions can then be made useful in a number of different ways.

According to another aspect of the present invention the access point is provided to include the radio performance message with the message received from the station when the access point relays messages from the station to the access router.

If the station transmitting is associated with a particular access point it is beneficial, from performance point of view, to include the performance data and message identity in the ordinary message relay from the station to the access router. If the access point and the station are not associated, however, it is preferred not to relay the complete message received from the station to the access router since this would include much data relayed to the access router through another access point. It is thus, performance wise, beneficial to send a message comprising only the performance data and message identity, and possibly also the station identity, to the access router.

According to another aspect of the present invention the radio performance message comprises a station identity, and the access router is provided to compare the performance data from two messages having the same message identity and station identity but being received from different access points to determine which of the access points have the best radio characteristics in communicating with the identified station.

By comparing performance data from the same message received by different access points it is possible to draw conclusions about which access point is most favorable from radio characteristics point of view. This information could for instance be used for handover or load balancing purposes.

According to another aspect of the present invention the access router is provided to store and to process the performance data to provide statistics relating to the radio environment for each station.

By providing and analyzing radio environment statistics it is possible to detect undesirable situations in the radio network and to find possible remedies. For instance, it could be noted that a certain geographic area lacks coverage and that additional access points need to be implemented.

According to another aspect of the present invention the message identification means is within the LAN, globally synchronized clock and the message identity is a time-stamp.

According to another aspect of the present invention the access router comprises means for sending control messages to a selected access point, the access router is provided to send first control messages to the access point being associated with the station, if it has not the most favorable radio characteristics, indicating that the access point should disassociate with the station, and the access router is provided to send second control messages to the access point having the most favorable radio characteristics, if it is not already associated with the station, indicating that the access point should associate with the station.

Thus, it is possible to provide hand-over.

According to another aspect of the present invention the radio performance data is any performance data selected from the group of performance data comprising: RSSI, receiving antenna, silence level etc.

According to another aspect of the present invention the communication system is an IEEE 802.11 communication system.

The invention is, according to one aspect and in slightly other words, a method by which each frame transmission, or message, may be uniquely identified to the access router, allowing for comparisons to be performed between RSSI for a given message at different access points. The invention is based, according to another aspect, on the maintenance of synchronized timers at the access points, whereby each received message is given a timestamp, which is sent to the access router together with other information that, in combination, uniquely identifies it to the access router. In the case of an IEEE 802.11 WLAN, the only other information necessary would be the transmitting station's MAC address.

According to another aspect of the invention only the AP to which the transmitting station is associated relays the message in full. Other access points only relay the necessary identifying information for the frame together with the RSSI information.

One advantage according to the invention is that it allows precise comparisons of received signal strength or other reception characteristics for an individual frame transmission or message between all access points who received a given message, without unnecessarily increasing network load.

The invention could be used in any packet-based network where a single packet transmission can be heard by a number of receivers, and it is desired to compare properties of the transmission as perceived by each of the different receivers.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1-4, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
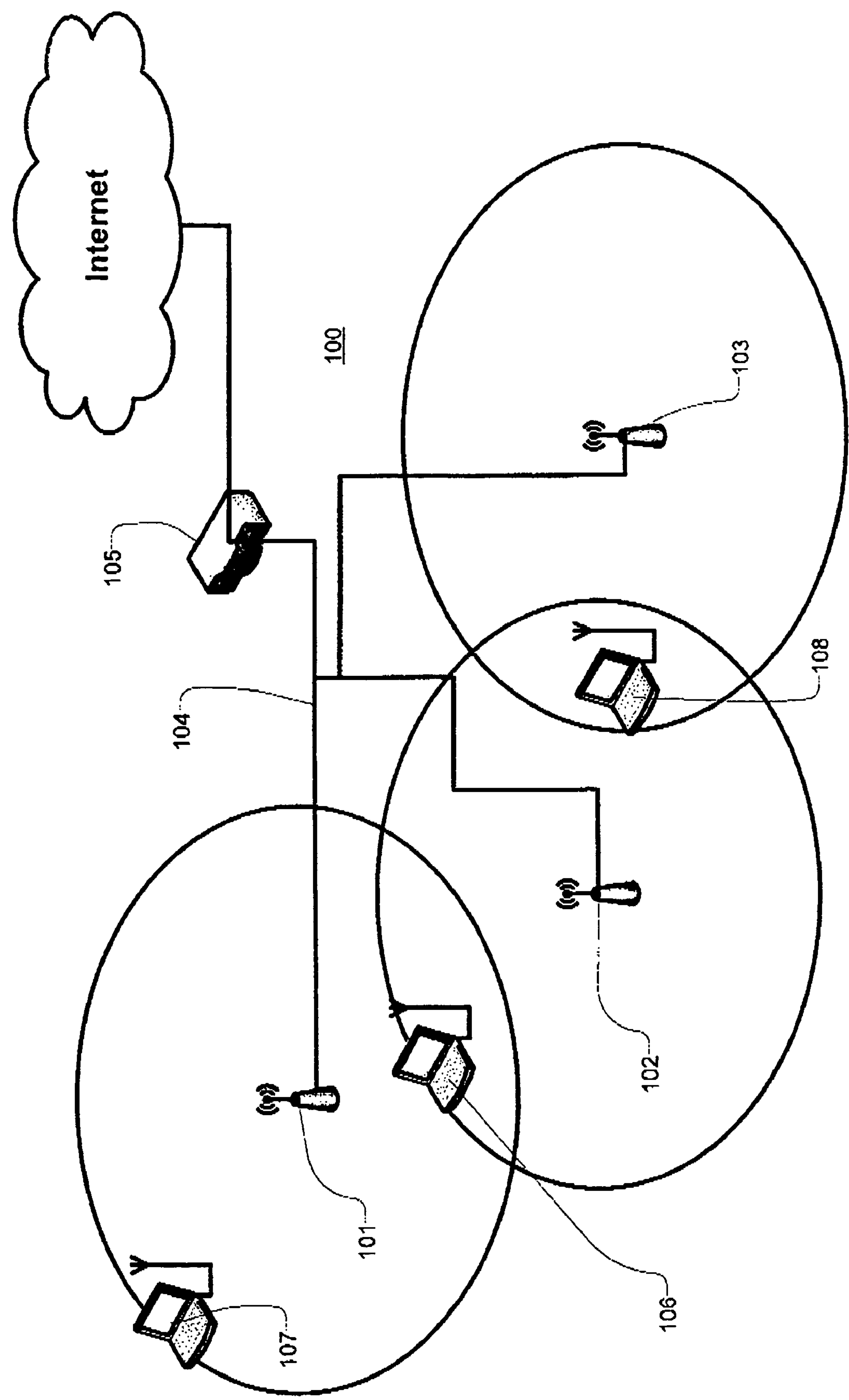
FIG. 1 is a schematic diagram of a preferred embodiment according to the invention.

A simplified illustrative embodiment of the invention is shown in FIG. 1 and comprises a LWAP system (Light weight access point), and consists of first 101, second 102 and third 103 access points, according to the third aspect of the invention connected via a wired network 104 to an access router 105 according to the fourth aspect of the invention. Three wireless stations are communicating via the network: a first station 106 lies within range of the first 101 and second 102 access point, a second station 107 lies only within range of the first access point 101, and a third station 108 lies within range of the second access point 102 and the third access point 103.

The first wireless station 106 could communicate either with the first 101 or the second 102 access point. However, the presence of the second station 107 that can only communicate with the first access point 101 means that the first access point 101 will experience greater network load. In this case, it may be desirable to cause the first wireless station to communicate with the second access point 102 instead, e.g. by causing the first access point 101 to refuse to allow it to associate, as will be described further below. In this case, a similar decision would be made for the third station 108.

The operation of the communication system 100, access points 101 to 103 and access router 105 disclosed in FIG. 1 will now be described in connection with FIG. 2 to 4.

Figure 2:
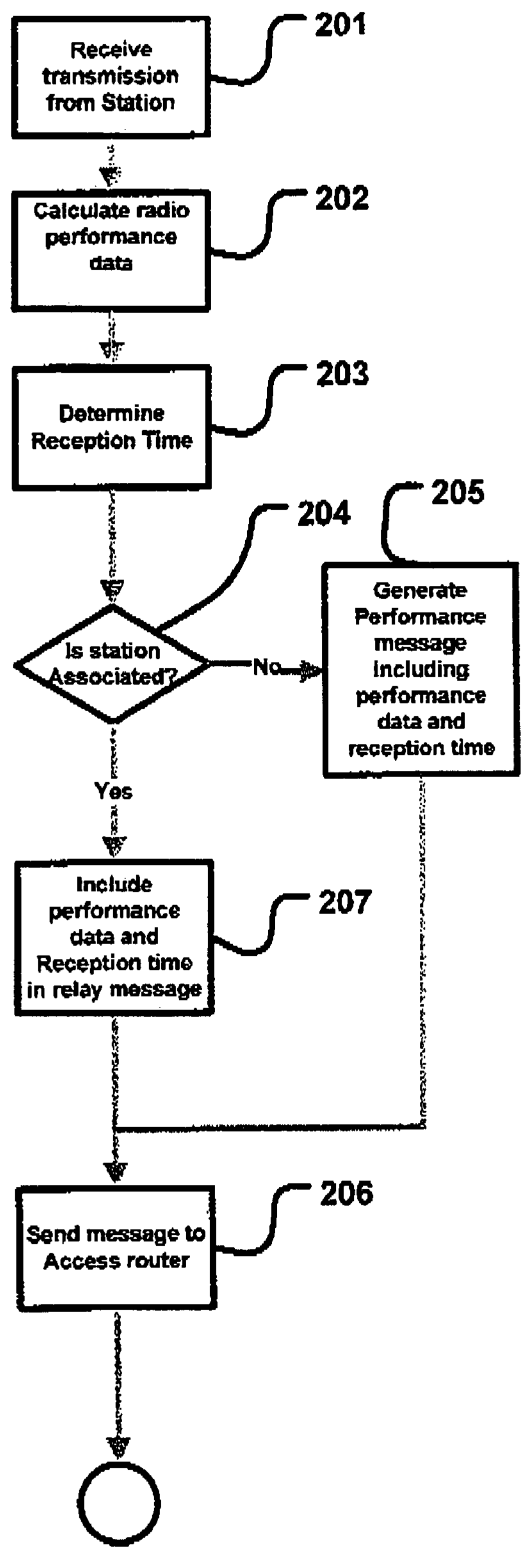
FIG. 2 to 4 are schematic flow diagrams of preferred embodiments according to the invention.

FIG. 2 is a schematic flow diagram of the operation of an access point according to a preferred embodiment of the invention. The station 106 transmits a message. The first access point 101 receives the transmission from the station 106 in step 201, as does the second access point 102. Each of the first and second access points calculates RSSI values for the radio signaling transmitting the message in step 202. The RSSI value calculated by the first access point 101 will of course differ from the RSSI value calculated by the second access point due to e.g. radio environment and distance from the first station 106 to respective access point.

The first and second access point then determine a reception time from globally synchronized clocks kept at each access point in step 203. Even though the reception time for each access point could be slightly different for the received message, the difference is so small that the message can be uniquely identified at the access router 105 by comparing the reception times.

In situations such as IEEE 802.11 where identical copies of a frame can be transmitted, it is necessary to use additional knowledge in order to uniquely identify the frame. A suitable candidate would be to apply a time-stamp to the received frame at each access point. These time-stamps could then be related to one another at the access router, thereby uniquely identifying each transmission. The clock function from which these time-stamps were generated would require global synchronization between the access router and the APs. However, since the required accuracy is the duration of a minimum-length frame this synchronization would not be a difficult task. A well-known suitable algorithm would be for each AP to maintain a free-running clock: and for the access router to periodically send a broadcast message on the network, to which each AP would respond with the value of its local clock at the time that the broadcast message was received.

The first access point 101 is not associated with the first station 106 so the test 204 is negative for the first access point 101. Thus, the first access point generates a performance data message including the RSSI value, the reception time as a time-stamp and the MAC-address, uniquely identifying the first station 106 and sends it to the access router 105 in step 205 and 206.

For the case of those APs which hear the transmission but to whom the transmission was not specifically directed, e. g. in the case of an IEEE 802.11 WLANs, those APs to which the station was not associated, there may be no benefit to be obtained in transmitting the entire received frame. In this case, load on the overall network can be reduced by extracting the necessary identifying information from the received frame, possibly compressing it and then the identifying information together with parameters of interest for the frame, e.g. RSSI.

The second access point 102 is associated with the first station 106 and therefore attaches the performance data and the time-stamp to the message received from the first station 106 and relays the composite message further to the access router 105 in steps 207 and 206. The MAC-address of the first station 106 is already included in the message.

Figure 3:
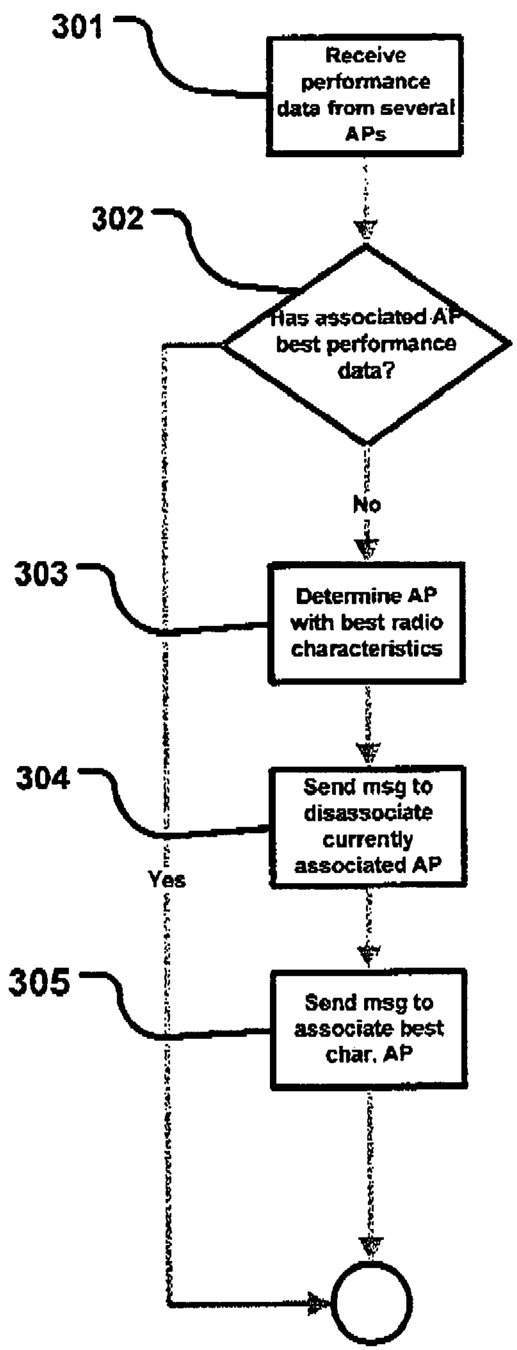

The performance data from the first and second access points is received at the access router .105 in step 301 in FIG. 3.

The access router checks, in step 302, if the currently associated access point, that is access point 102, has the best radio performance. If so, no particular action, other than conventional actions are taken. Assuming that the radio performance for the first access point is better than the radio performance for the second access point step 303 is reached. In this respect it should be noted that "better radio performance" may include comparing the different RSSI values with thresholds, as well as to each other, and also requiring that the "better" value should be "better" to a specific degree before any action is taken.

In step 303, the access point having the best radio performance is found, in this example, best radio performance is equal to best RSSI. The first access point is thus found to have the best RSSI value. The access router 105 then sends a message to the second access point 102 ordering the second access point to disassociate with the first station 106 in step 304. The access router continues to send a further message to the first access point 101 ordering it to associate with the first station 106. This, signaling may of course comprise any necessary acknowledgement messages according to conventional technique. In this way a hand-over between the second access point 102 and the first access point has been achieved.

Also other control parameters may be used in determining association between access points and stations, such as load situations, as will be described below.

Figure 4:
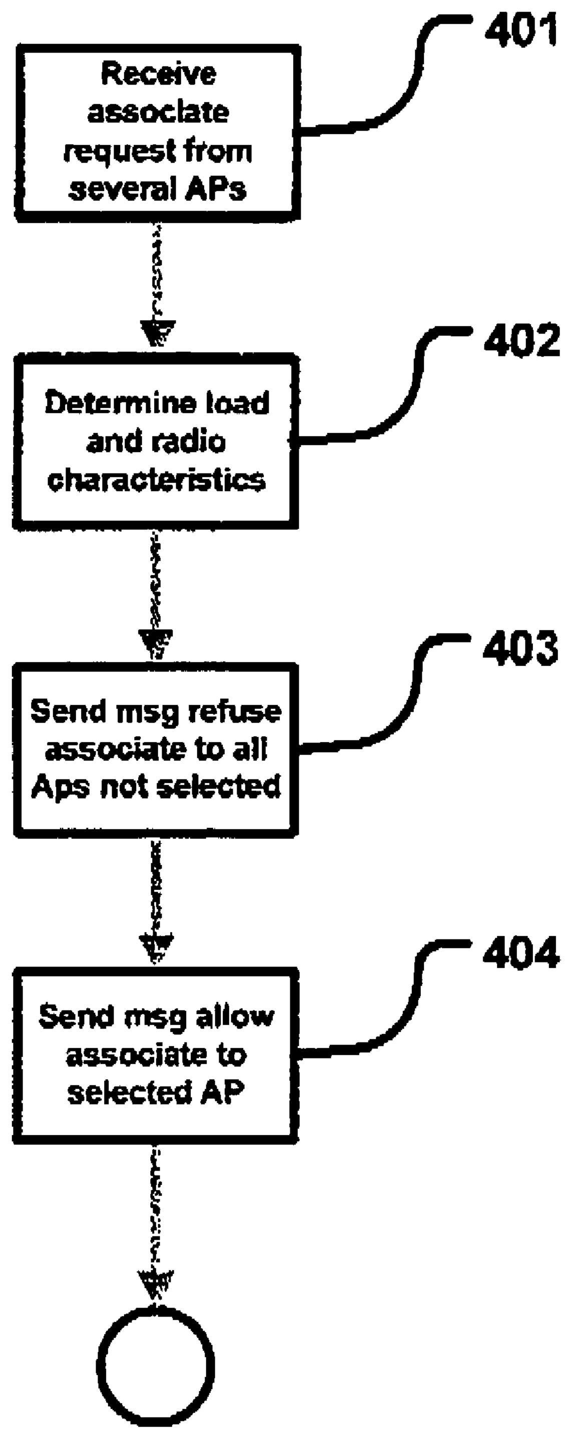

FIG. 4 is a schematic flow diagram according to a preferred embodiment of the invention. In step 401 the access router 105 in FIG. 1 receives an association request from the second and third access points 102 and 103. Assuming that, in this example, the first station 106 is associated with the second access point 102, the access router finds in step 402 that the second and third access points have similar radio performance characteristics and that the second access point already has the first station 106 associated. Thus, it would be beneficial from a network load perspective to let the third station 108 associate with the third access point 103. In step 403 the access router thus sends a "REFUSE ASSOCIATION" message to the second access point 102 and in step 404 an "ALLOW ASSOCIATION" message to the third access point 103.

Consequently, load balancing is achieved in the network.

In an IEEE 802.11 network, where the time-stamp has a precision of at least the time for a minimum-length transmitted frame, then the only additional identifying data that would be required would be the 802.11 transmitting MAC address.

It will be obvious that the invention may be varied in a plurality of ways. Such variations are not to be regarded as a departure from the scope of the invention. All such modifications as would be obvious to one skilled in the art are intended to be included within the scope of the appended claims.

I claim:

1. A communication system comprising at least a first and a second access point, one or more user stations, and an access router, wherein said at least first and second access point are provided to receive radio signaling from at least a first user station and one of said at least first and second access point are provided to relay messages received through said radio signaling from said at least first user station, each of said at least first and second access point comprises radio communication performance means provided to extract performance data, for each message received from said at least first user station, from said radio signaling, each of said at least first and second access points comprises a message identification means provided to generate a message identity for each message received from said at least first user station and where said message identity uniquely identifies a message transmitted from said at least first user station and received by each of said at least first and second access points, wherein said message identity comprise a time-stamp, each of said at least first and second access points is provided to send radio performance messages to said access router comprising said message identity and said performance data of the message from said at least first user station, said access router is provided to receive said radio performance messages from said at least first and second access point, said access router is provided to further relay messages, received from a station and relayed through an access point, to another network, and said access point is provided to attach said radio performance message in the message received from said station when said access point relays messages from said station to said access router.

2. The communication system according to claim 1, wherein said radio performance message comprises a station identity, and said access router is provided to compare said performance data from two messages having the same message identity and station identity but being received from different access points to determine which of said access points have the best radio characteristics.

3. The communication system according to claim 2, wherein said access router comprises means for sending control messages to a selected access point, said access router is provided to send a first control message to the access point being associated with said station, if it has not the most favorable radio characteristics, indicating that the access point should disassociate with said station, and said access router is provided to send a second control message to the access point having the most favorable radio characteristics, if it is not already associated with said station, indicating that the access point should associate with said station.

4. The communication system according to claim 1, wherein said access router is provided to store and to process said performance data to provide statistics relating to the radio environment for each station.

5. The communication system according to claim 1, wherein said message identification means is a, within the network, globally synchronized clock.

6. The communication system according to claim 1, wherein said radio performance data is any performance data selected from the group of performance data comprising: RSSI, receiving antenna, silence level.

7. The communication system according to claim 1, wherein said communication system is an IEEE 802.11 communication system.

8. A method for communication in a network comprising at least a first and a second access point, at least a first station and an access router, the method comprising the steps of:

receiving radio signaling, at said at least first and second access points, from said at least first station, relaying messages received from said at least first station by one of said at least first and second access point, extracting performance data from said radio signaling for receiving messages from said at least first station by each of said at least first and second access point, generating, in each of said at least first and second access point, a message identity for each message received from said at least first station and where said message identity uniquely identifies a message transmitted from said at least first station and received by each of said at least first and second access points, wherein said message identity comprises a time-stamp, sending, from each of said at least first and second access point, radio performance messages to said access router comprising at least said message identity and said performance data of the message from said at least first station, receiving said radio performance messages from said at least first and second access point at said access router, relaying messages, received at said access router from a station through an access point, to another network, and attaching said radio performance message in the message received from said station when said station is associated with said access point and said access point relays messages from said station to said access router.

9. The method according to claim 8, wherein said radio performance message comprises a station identity, and comprising the step of:

comparing said performance data from two messages having the same message identity and station identity but being received from different access points.

10. The method according to claim 9, wherein said access router comprises means for sending control messages to a selected access point, and the method comprises the steps of:

determining, from said comparison, which of said access points have the most favorable radio performance, determining which of said access points is currently associated with said station, sending a control message to the access point currently associated with said station, if the access point has not the most favorable radio performance, indicating that the access point is to disassociated with said station, and sending a control message to the access point having the most favorable radio performance, if the access point is not currently associated with said station, indicating that the access point is to associate with said station.

11. The method according to claim 8, comprising the step of:

storing and processing said performance data to provide statistics relating to the radio environment for each station.

12. The method according to claim 8, wherein said message identification means is a globally synchronized clock.

13. The method according to claim 8, wherein said radio performance data is any performance data selected from the group of performance data comprising: RSSI, receiving antenna, silence level etc.

14. The method according to claim 8, wherein said network is an IEEE 802.11 network.

15. An access router configured to operate in an network, wherein said network comprises at least a first and a second access point and at least one user station, wherein said at least first and second access point are provided to receive radio signaling from at least a first user station and one of said at least first and second access point are provided to relay messages received through said radio signaling from said at least first user station, wherein said access router is configured to:

further relay messages, received from a user station and relayed through an access point, to another network, receive performance messages from each of said at least first and second access point wherein each performance message comprises at least radio performance data and a message identity uniquely identifying the performance message as being associated with a message transmitted from the at least one station and received by each of said at least first and second access points, wherein said message identity comprises a time-stamp, where an access point attaches said radio performance message in said message received from said user station when relaying the message from said user station to said access router, and compare radio performance data from each access point having same message identity to identify the access point having the most favorable radio characteristics.

* * * * *